(12) United States Patent
Kurtz et al.

(10) Patent No.: US 6,691,581 B2
(45) Date of Patent: *Feb. 17, 2004

(54) PRESSURE TRANSDUCER FABRICATED FROM BETA SILICON CARBIDE

(75) Inventors: Anthony D. Kurtz, Ridgewood, NJ (US); Alexander A. Ned, Wayne, NJ (US)

(73) Assignee: Kulite Semiconductor Products, Inc., Leonia, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/271,674

(22) Filed: Mar. 18, 1999

(65) Prior Publication Data

US 2002/0029638 A1 Mar. 14, 2002

Related U.S. Application Data

(63) Continuation-in-part of application No. 08/450,108, filed on May 25, 1995, now abandoned.

(51) Int. Cl.[7] .............................. G01L 9/00; G01L 9/16
(52) U.S. Cl. ........................................................ 73/754
(58) Field of Search .......................... 73/708, 721, 727, 73/754, 777, 862, 627; 252/521; 338/2, 4, 47; 374/185

(56) References Cited

U.S. PATENT DOCUMENTS 5,165,283 A    11/1992    Kurtz et al. ................... 73/727

*Primary Examiner*—William Oen
(74) *Attorney, Agent, or Firm*—Duane Morris LLP

(57) ABSTRACT

A method for fabricating a dielectrically isolated silicon carbide high temperature pressure transducer which is capable of operating at temperatures above 600° C. The method comprises applying a layer of beta silicon carbide of a first conductivity, on a first substrate of silicon. A layer of beta silicon carbide of a second conductivity is then applied on a second substrate. A layer of silicon is sputtered, evaporated or otherwise formed on the silicon carbide surfaces of each of the substrates of the beta silicon carbide. The sputtered silicon layer on each substrate is then completely oxidized forming a layer of $SiO_2$ from the silicon. The first and second substrates are subsequently fusion bonded together along the oxide layers of the first and second substrate with the oxide layer providing dielectric isolation between the first and second wafers. This oxide layer, which is formed from the Si layer, has a much lower defect density than $SiO_2$ formed directly from SiC. At least one sensing element is then fabricated from the beta silicon carbide of the second conductivity, and the overlaying original silicon on the second substrate is moved.

17 Claims, 3 Drawing Sheets

PRESSURE TRANSDUCER FABRICATED FROM BETA SILICON CARBIDE

RELATED APPLICATIONS

This application is a continuation-in-part of:

commonly assigned U.S. patent application Ser. No. 08/450,108, entitled "High Temperature Pressure Transducer Fabricated from Beta Silicon Carbide," filed May 25, 1995, now abandoned.

FIELD OF THE INVENTION

The present invention relates generally to high temperature pressure transducers and more particularly, to a high temperature pressure transducer fabricated from beta silicon carbide.

BACKGROUND OF THE INVENTION

As is well known in the art, pressure transducers generally include a force collector and one or more piezoresistive sensor elements. Many different types of pressure transducer structures have been proposed to increase the reliability and accuracy of such devices in high temperature applications.

Higher temperature operation of pressure transducers employing silicon diaphragms has been made possible by providing a dielectric isolation between the silicon sensor network and the silicon diaphragm-like force collector. These devices are generally capable of operating at temperatures in excess of 500° C. Above 600° C., however, the silicon sensing network as well as the silicon diaphragm, undergo significant plastic deformation rendering the device useless as a pressure transducer. This problem was addressed and solved in the prior art by employing, either alpha-silicon carbide or beta silicon carbide as both a sensor network and as the diaphragm. For example, see U.S. Pat. No. 5,165,283 entitled HIGH TEMPERATURE TRANSDUCERS AND METHOD OF FABRICATING THE SAME EMPLOYING SILICON CARBIDE issued to Anthony. D. Kurtz et al. and assigned to Kulite Semiconductor Products, Inc. the assignee herein. A heteroepitaxial growth process is described in this patent for growing alpha or beta silicon carbide on silicon substrates to fabricate pressure transducers capable of operating at extremely high temperatures in excess of 600° C.

The alpha silicon carbide (6H SiC) and beta silicon carbide (3C SiC) described in U.S. Pat. No. 5,165,283, are just two of 200 different polytypes identified in SiC. Beta silicon carbide, however, has some distinct advantages over alpha silicon carbide. One advantage is that there is no limit on the size of the wafers that can be used in fabricating the pressure transducers. Another advantage is that beta silicon carbide is, overall, much easier and less time consuming to fabricate than growing alpha silicon carbide, and is, thus, much less costly to fabricate than alpha silicon carbide. Furthermore, beta silicon carbide does not have inclusions and "pipes" which are usually present in 6H SiC which makes the fabrication of pressure transducers very difficult.

Beta silicon carbide exhibits gauge factors of above 30 at room temperature and gauge factors of between 10–15 at 550° C. Thus, beta silicon carbide's ability to operate at temperatures above 500° C., while exhibiting basically temperature independent gage factors of 10–15 at such temperatures, and providing a 10 factor improvement in sensitivity over the metal gages, makes beta silicon carbide a very plausible material for high temperature applications. Moreover, the technology for processing beta silicon carbide in terms of metallization, etching, and patterning has been demonstrated by the prior art in patents such as U.S. Pat. No. 5,165,283.

Although prior art semiconductor devices made from beta silicon carbide films on silicon are possible, such devices made in production quantities have a high defect density. This is due to the large thermal and lattice mismatches (8% and 20% respectively) between the beta silicon carbide and the silicon which causes poor quality p-n junctions in beta silicon carbide. Hence, attempts at providing semiconductor pressure transducers microfabricated from beta silicon carbide have been generally unsuccessful. Moreover, oxides formed directly on beta SiC have great defect density.

It is, therefore, a primary object of the present invention to provide a semiconductor pressure transducer device made from beta silicon carbide which avoids the problems associated with the prior art devices.

SUMMARY OF THE INVENTION

A method for fabricating a dielectrically isolated silicon carbide high temperature pressure transducer which is capable of operating at temperatures above 600° C. The method comprises applying a layer of beta silicon carbide of a first conductivity, on a first substrate of silicon. A layer of beta silicon carbide of a second conductivity is then applied on a second substrate. A layer of silicon is sputtered, evaporated or otherwise formed on the silicon carbide surfaces of each of the substrates of the beta silicon carbide. The sputtered silicon layer on each substrate is then completely oxidized forming a layer of $SiO_2$ from the silicon. The first and second substrates are subsequently fusion bonded together along the oxide layers of the first and second substrate with the oxide layer providing dielectric isolation between the first and second wafers. This oxide layer, which is formed from the Si layer, has a much lower defect density than $SiO_2$ formed directly from SiC. At least one sensing element is then fabricated from the beta silicon carbide of the second conductivity, and the overlaying original silicon on the second substrate is moved.

Also provided is a high temperature pressure transducer, comprising a diaphragm fabricated from a beta-silicon carbide semiconductive material of a first conductivity. At least one sensing element fabricated from a beta-silicon carbide semiconductive material of a second conductivity is disposed on the diaphragm, but dielectrically isolated from it by a $SiO_2$ layer.

BRIEF DESCRIPTION OF THE FIGURES

For a detailed understanding of the present invention, reference should be made to the following detailed description taken in conjunction with the accompanying drawings wherein.

DETAILED DESCRIPTION OF THE INVENTION

The pressure transducer device of the present invention substantially overcomes the problems associated with prior art pressure transducers devices fabricated from beta silicon carbide. This is accomplished in the present invention by fabricating dielectrically isolated piezoresistive sensor elements from a beta silicon carbide film of a first conductivity type on top of a beta silicon carbide diaphragm of a second conductivity type. This is accomplished in a novel process that utilizes two separately processed wafers which are bonded together.

Figure 1A:
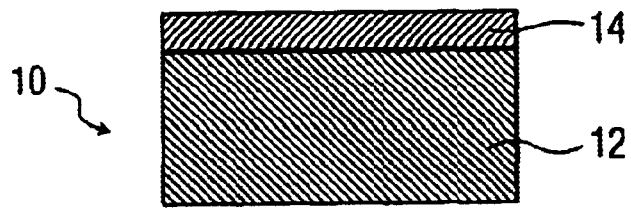
FIGS. 1A and 1B are cross-sectional views which depict the fabrication of a first wafer which is utilized in the method of the present invention.

FIG. 1A, depicts the first processing step of the present invention. As shown, a first wafer 10 has been processed by applying a diaphragm layer of beta silicon carbide 14 over a silicon substrate 12. The beta silicon carbide layer 14 is doped to a first conductivity which can be either n or p. For illustrative purposes only, the beta silicon carbide layer 14 is shown as n-doped. The thickness of beta silicon carbide layer 14 is determined by the desired pressure range of the sensor and is generally between 3 and 20 micrometers (um) thick. The beta silicon carbide diaphragm layer 14 can be applied to the silicon substrate 12 using chemical vapor deposition (CVD). Depositing thin films of silicon carbide onto silicon substrates by chemical vapor deposition is described in U.S. Pat. No. 5,165,283 mentioned earlier.

The silicon substrate 12 is fabricated from a high resistivity n or p-type silicon of preferably a <100> crystal axis. The silicon substrate 12 operates as a mechanical support structure for the diaphragm layer 14. Pressure transducer device of the present invention is capable of operating above 600° C. even though silicon is used as a mechanical support structure for the diaphragm layer 14. This is possible since most of the stress will be in the beta silicon carbide diaphragm layer 14 and not the silicon substrate 12. However, the silicon substrate 12 will still be the limiting factor in terms of maximum temperature capability. To further increase the temperature range of operation, the diaphragm and the support areas can all be fabricated from a substrate of beta silicon carbide using well known photoelectrochemical micromachining techniques described in the prior art.

In any case, the wafer 10 is further processed by applying a layer of silicon over the beta silicon carbide layer 14 using a RF sputtering technique. The silicon layer is preferably sputtered to a thickness of between 5,000 and 20,000 angstroms. This enables the silicon layer to be polished to a substantially flat planar surface using conventional planarization techniques. The flat planar surface will enable the wafer 10 to be bonded to a second wafer as will soon be described.

Figure 1B:
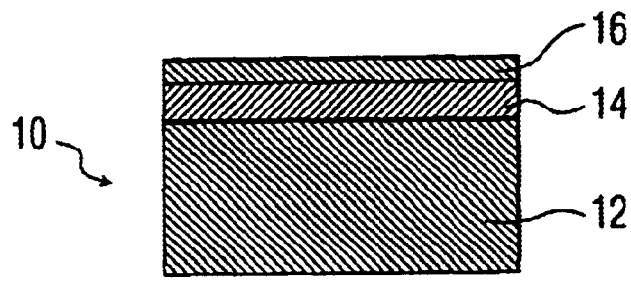

FIG. 1B, depicts the wafer 10 after the polished layer of silicon has been converted to a layer 16 of silicon dioxide which will eventually operate as a dielectric isolating layer on the beta silicon carbide diaphragm layer 14. The silicon dioxide layer 16 can be formed from silicon in a direct oxidation technique whereby the wafer is heated in a high temperature furnace to approximately 1000° C.–1300° C. and passing oxygen over the silicon coated diaphragm layer 14.

Figure 2A:
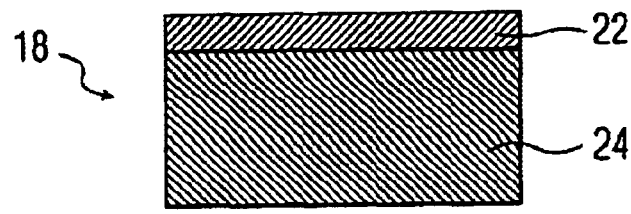
FIGS. 2A and 2B are cross-sectional views which depict the fabrication of a second wafer which is utilized in the method of the present invention.
Figure 2B:
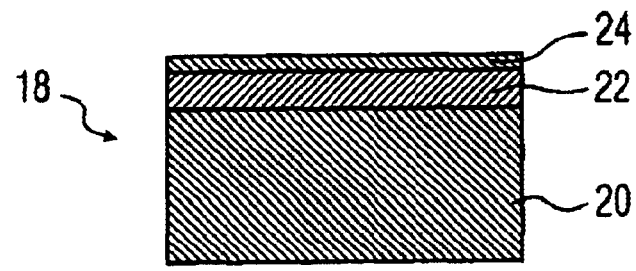

FIGS. 2A and 2B, depict the fabrication of a second wafer 18 which will be processed and then bonded to the first wafer 10. In FIG. 2A, the second wafer is fabricated by applying a sensor layer 22 of beta silicon carbide over a surface of a silicon substrate 20. The beta silicon carbide layer 22 of the second wafer 18 is doped to a second conductivity which may be different than the first conductivity of the beta silicon carbide layer of the first wafer 10. Accordingly in this embodiment, the beta silicon carbide layer 22 is n-doped. The thickness of the beta silicon carbide sensor layer 22 is determined by the targeted resistance of the device since the sensor layer 22 will eventually be formed into the piezoresistive sensing elements of the device. Like the first wafer 10, the second wafer 18 also includes a 5,000–20,000 angstrom thick layer of silicon which is applied over the beta silicon carbide sensor layer 22. The silicon layer is polished and then converted to a layer of silicon dioxide 24 using the same techniques described with respect to the first wafer 10. FIG. 2B depicts the resulting structure of the second wafer 18 at this stage of processing. At this stage of processing, the first and second wafers 10 and 18, are now ready to be bonded to one another.

Figure 3A:
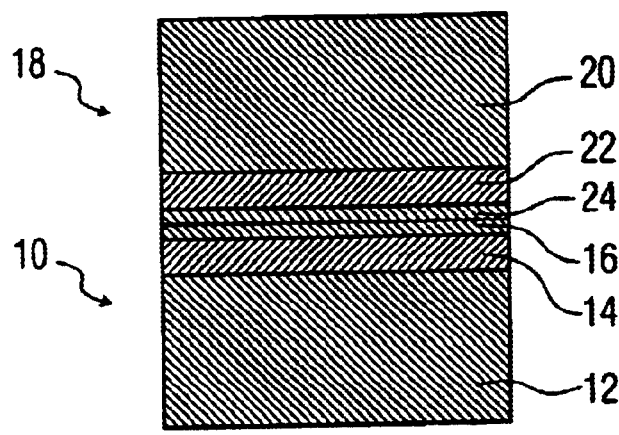
FIG. 3A is a cross-sectional view which depicts the bonding together of the first and second wafers.
Figure 3B:
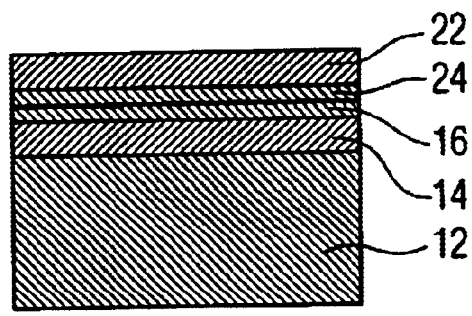
FIG. 3B is a cross-sectional view of the bonded wafers of FIG. 3A after the semiconductive substrate of the second wafer has been removed.

In FIG. 3A, the first and the second wafers 10 and 18 have been bonded to one another in a fusion bonding technique. As shown, the first and second wafers 10 and 18 are oriented so that bonding occurs along their respective silicon dioxide layers 16 and 24. The wafers are bonded at a temperature of between approximately 900° C. and 1000° C. for approximately 5 to 10 minutes. Such a fusion bonding technique is described in U.S. Pat. No. 5,286,671 entitled FUSION BONDING TECHNIQUE FOR USE IN FABRICATING SEMICONDUCTOR DEVICES issued to Anthony D. Kurtz et al. and assigned to Kulite Semiconductor Products, Inc. the assignee herein.

Figure 3C:
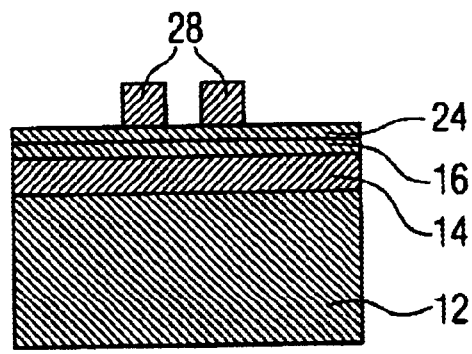
FIG. 3C is a cross-sectional view which depicts the fabrication of one or more sensing elements.

In FIG. 3C, piezoresistive sensor elements 28 have been fabricated from the beta silicon carbide sensor layer 22 using well known patterning techniques such as electrochemical etching, reactive ion etching or plasma etching. Such techniques are described in the earlier mentioned U.S. Pat. No. 5.165,283.

Figure 3D:
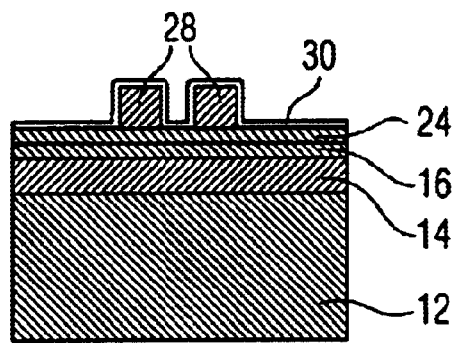
FIGS. 3D and 3E are cross-sectional views which depict the fabrication of contacts.

In FIG. 3D, a passivation layer 30 of quartz or nitride has been applied over the sensor elements 28 using conventional techniques. The passivation layer operates to protect the sensor elements 28 from the environment and also enables contacts to be formed. The passivation layer 30 is approximately 2000–5000 angstroms thick and operates to protect the sensor elements 28 from the environment and enables contacts to be formed. Apertures or contact windows are then etched into the passivation layer 30 using a conventional buffered oxide etch.

Figure 3E:
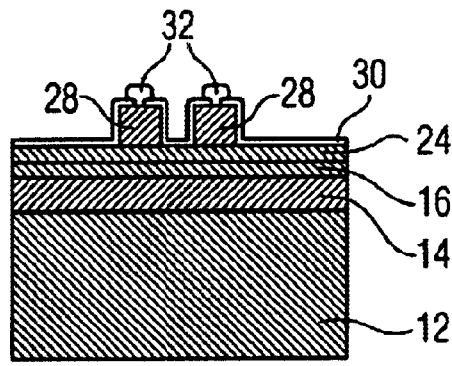

In FIG. 3E, contacts 32 have been formed by filling the contact windows with a suitable well known contact metallization which can be sputtered or otherwise deposited onto the passivation layer 28. The metallization system used for the contacts 32 should be appropriate for establishing high quality contacts for high temperature applications. Examples of such metallizations include titanium, tungsten or tantalum for the ohmic contact portion and platinum or gold as a conductive layer. For a more detailed discussion of contacts, see U.S. Pat. No. 5,165,283.

Figure 3F:
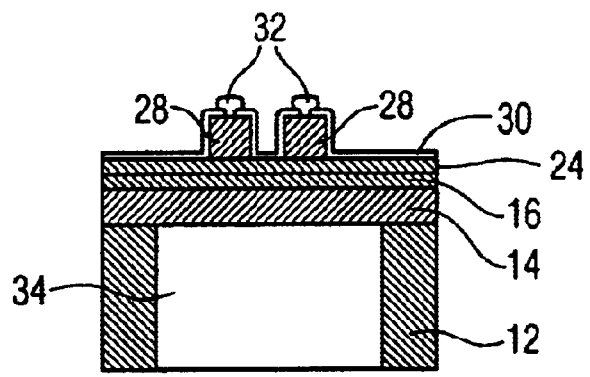
FIG. 3F is a cross-sectional view which depicts the fabrication of an aperture in the diaphragm support structure.

FIG. 3F depicts the device after the diaphragm layer 14 has been rendered operative by the formation of an aperture 34 in the silicon substrate 12. The aperture is fabricated by micromachining the silicon substrate 12 using a well known anisotropic etching technique. In such a technique etching will continue through the silicon substrate until the diaphragm layer 14, which acts as an etch stop, is exposed for the silicon etch. Once the aperture is completed, the diaphragm layer 14 can be deflected by a force exerted thereon. The flexing stresses of the diaphragm layer 14 elongate and shorten the piezoresistor sensing elements 28 and cause them to vary their resistance according to the deflection of the diaphragm.

The implementation of dielectrically isolated piezoelectric sensing elements made from beta silicon carbide of a first conductivity on a diaphragm made from beta silicon carbide of a second different conductivity, provides a pressure transducer which is capable of operational temperatures well in excess of 600° C. It should be understood that the embodiments described herein are merely exemplary and that a person skilled in the art may make many variations and modifications to these embodiments utilizing functionally equivalent elements to those described herein. Such variations and modifications which may become apparent to those skilled in the art, are intended to be included within the scope of the invention as defined by the appended claims.

What is claimed is:

1. A high temperature pressure transducer comprising:
   a first wafer comprising;
      a diaphragm fabricated from a beta-silicon carbide semiconductive material of a first conductivity and an oxide layer deposited on said diaphragm; and
   a second wafer comprising;
      at least one sensing element fabricated from a beta-silicon carbide semiconductive material of a second conductivity and an oxide layer deposited on said at least one sensing element wherein said second wafer is oppositely opposed said first layer such that said first wafer oxide layer and said second wafer oxide are joined to dielectrically isolate said at least one sensing element from said diaphragm.

2. The high temperature pressure transducer according to claim 1, wherein said oxide layer is composed of silicon dioxide.

3. The high temperature pressure transducer according to claim 1, further comprising a contact for electrically coupling to said at least one sensing element.

4. The high temperature pressure transducer according to claim 1, further comprising a supporting member composed of a semiconductive material, said diaphragm being disposed on said supporting member.

5. The high temperature pressure transducer according to claim 4, wherein said supporting member includes an aperture which is oriented underneath a portion of said diaphragm to enable said portion of said diaphragm to deflect when a force is exerted thereon.

6. The high temperature pressure transducer according to claim 5, wherein said supporting member is fabricated from a silicon semiconductive material.

7. The high temperature pressure transducer according to claim 5, wherein said supporting member is fabricated from a silicon carbide semiconductive material.

8. The high temperature pressure transducer according to claim 1, wherein said at least one sensing element comprises at least one piezoresistive element.

9. A method for fabricating a high temperature pressure transducer, comprising the steps of:
   applying a layer of beta silicon carbide of a first conductivity, on a first substrate;
   forming an oxide layer on said layer of beta silicon carbide of said first conductivity;
   applying a layer of beta silicon carbide of a second conductivity different from said first conductivity, on a second substrate;
   forming the oxide layer on said layer of beta silicon carbide of said second conductivity;
   bonding said first and second substrates together along said oxide layers of said first and second substrates; and
   forming at least one sensing element from said beta silicon carbide of said second conductivity.

10. The method according to claim 9, further comprising the step of micromachining an aperture in said first substrate using said beta silicon carbide of said first conductivity as an etch stop, said aperture enabling a portion of said layer of beta silicon carbide of said first conductivity to deflect when a force is exerted thereon.

11. The method according to claim 9, wherein said step of forming said oxide layer on said beta silicon carbide of said first conductivity includes the steps of
   depositing a layer of silicon on said layer of beta-silicon carbide of said first conductivity; and
   converting said layer of silicon to silicon dioxide.

12. The method according to claim 9, wherein said step of forming said oxide layer on said beta silicon carbide of said second conductivity includes the steps of
   depositing a layer of silicon on said layer of beta-silicon carbide of said first conductivity; and
   converting said layer of silicon to silicon dioxide.

13. The method according to claim 10, wherein said step of forming said at least one sensing element includes the steps of:
   etching said second substrate using said layer of beta-silicon carbide of said second conductivity as an etch stop; and
   selectively etching portions of said layer of beta-silicon carbide of said second conductivity to form said at least one sensing element using said oxide layers as an etch stop.

14. The method according to claim 9, further comprising the step of fabricating a contact for said at least one sensing element.

15. The method according to claim 14, wherein said step of fabricating said contact includes the steps of:
   depositing a passivation layer over said at least one sensing element;
   etching an opening in said passivation layer; and
   filling said opening with metal.

16. The method according to claim 9, wherein said first substrate is silicon carbide.

17. The method according to claim 9, wherein said second substrate is silicon.

* * * * *